(12) United States Patent
Sopel

(10) Patent No.: US 7,628,281 B2
(45) Date of Patent: Dec. 8, 2009

(54) STORAGE APPARATUS FOR LOCKING LOAD BARS DURING TRANSPORT

(75) Inventor: Matthew John Sopel, Friendswood, TX (US)

(73) Assignee: Yellow Rack, LLC, Friendswood, TX (US)

( * ) Notice: Subject to any disclaimer, the term of this patent is extended or adjusted under 35 U.S.C. 154(b) by 619 days.

(21) Appl. No.: 11/359,810

(22) Filed: Feb. 22, 2006

(65) Prior Publication Data
US 2007/0163972 A1 Jul. 19, 2007

Related U.S. Application Data

(60) Provisional application No. 60/759,859, filed on Jan. 18, 2006.

(51) Int. Cl.
*E05B 73/00* (2006.01)

(52) U.S. Cl. ........................................................ 211/7

(58) Field of Classification Search ...................... 211/7, 211/60.1, 87.01, 4, 123, 105.1; 403/353; 248/222.13, 306, 225.21; 292/57, 58, 63, 292/67, 71
See application file for complete search history.

(56) References Cited

U.S. PATENT DOCUMENTS

| 438,735 | A | | 10/1890 | Miller | |
|---|---|---|---|---|---|
| 1,822,037 | A | * | 9/1931 | Kerschner | 29/887 |
| 2,657,889 | A | | 11/1953 | Smalley | 248/67.7 |
| 3,695,657 | A | * | 10/1972 | Rosen | 292/57 |
| 3,797,284 | A | | 3/1974 | Grossman | 70/58 |
| 3,905,481 | A | * | 9/1975 | Laterra | 211/70.5 |
| 4,437,692 | A | * | 3/1984 | Halopoff | 292/57 |
| 4,462,497 | A | * | 7/1984 | Maule | 211/7 |
| 4,562,707 | A | * | 1/1986 | Graham, III | 70/58 |
| 4,662,805 | A | | 5/1987 | Tamez et al. | 410/33 |
| 5,052,601 | A | | 10/1991 | Carter et al. | 224/42 |
| 5,060,810 | A | | 10/1991 | Jones | 211/59.4 |
| 5,127,131 | A | * | 7/1992 | Corrigan et al. | 16/422 |
| 5,405,226 | A | | 4/1995 | Daves | 410/32 |
| 5,435,473 | A | | 7/1995 | Larkum | 224/569 |
| 6,290,113 | B1 | * | 9/2001 | Plyler | 224/315 |
| 6,364,141 | B1 | | 4/2002 | Ehrgott | 211/189 |
| 6,394,327 | B1 | | 5/2002 | Mietlicki | 224/547 |
| 6,622,979 | B2 | * | 9/2003 | Valiulis | 248/220.42 |
| 6,736,300 | B2 | | 5/2004 | Deakin | 224/319 |

* cited by examiner

*Primary Examiner*—Jennifer E. Novosad
(74) *Attorney, Agent, or Firm*—Elizabeth R. Hall

(57) ABSTRACT

The invention relates to a readily installable and removable device for storing multiple elongate locking load bars and other elongated items for use inside the bodies of trucks and vans. The device is readily and reversibly mounted on preexisting E-track slotted tracks in the cargo spaces of commercial fleet trucks. The device includes one or more wall mountable brackets having outwardly extending arms that form slots for receiving elongated members. The device is selectably installed using a latch engaged in the E-track slotted tracks and a self-locking latch retainer positioned on opposed ends of the brackets.

15 Claims, 7 Drawing Sheets

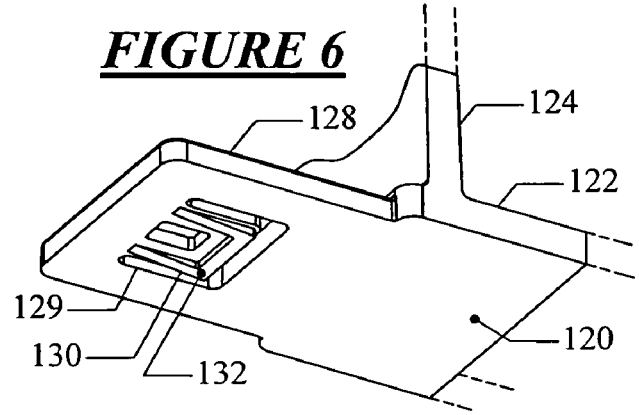
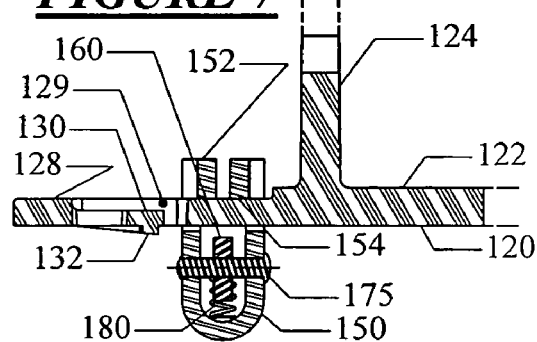
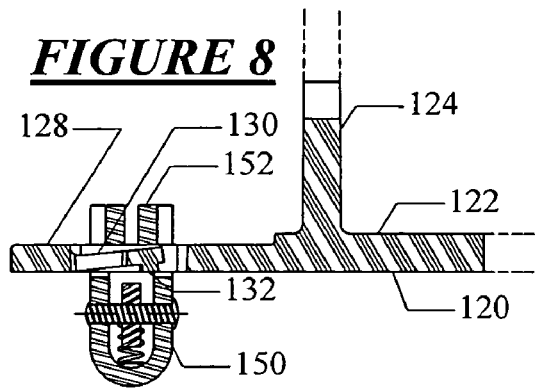
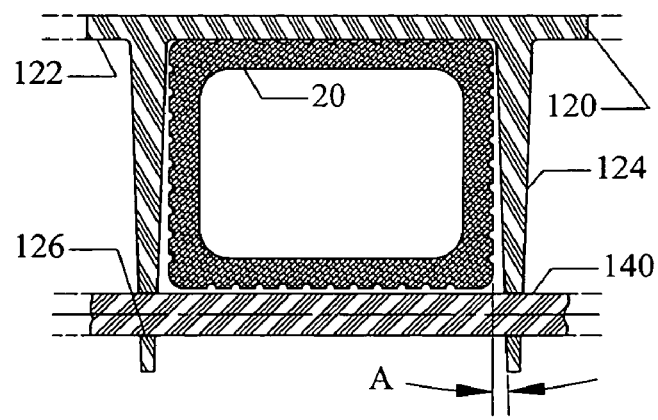

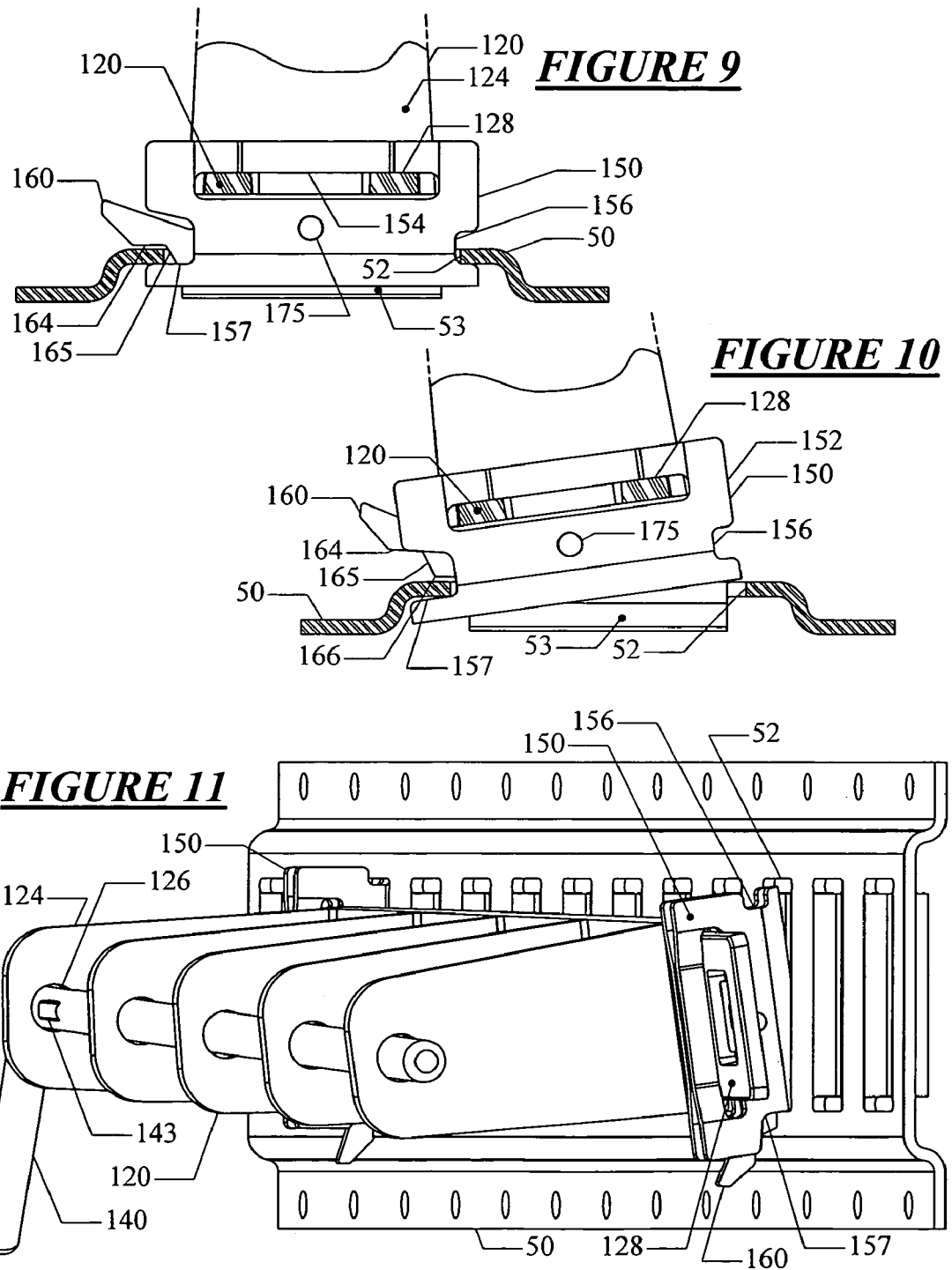

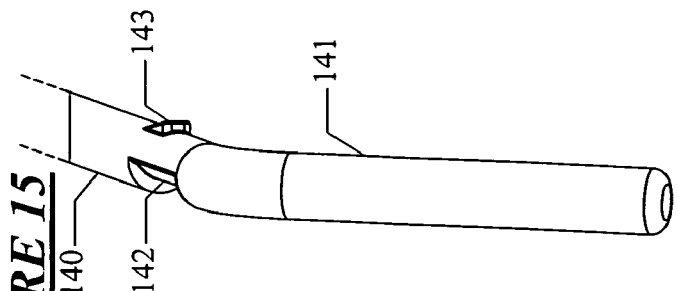
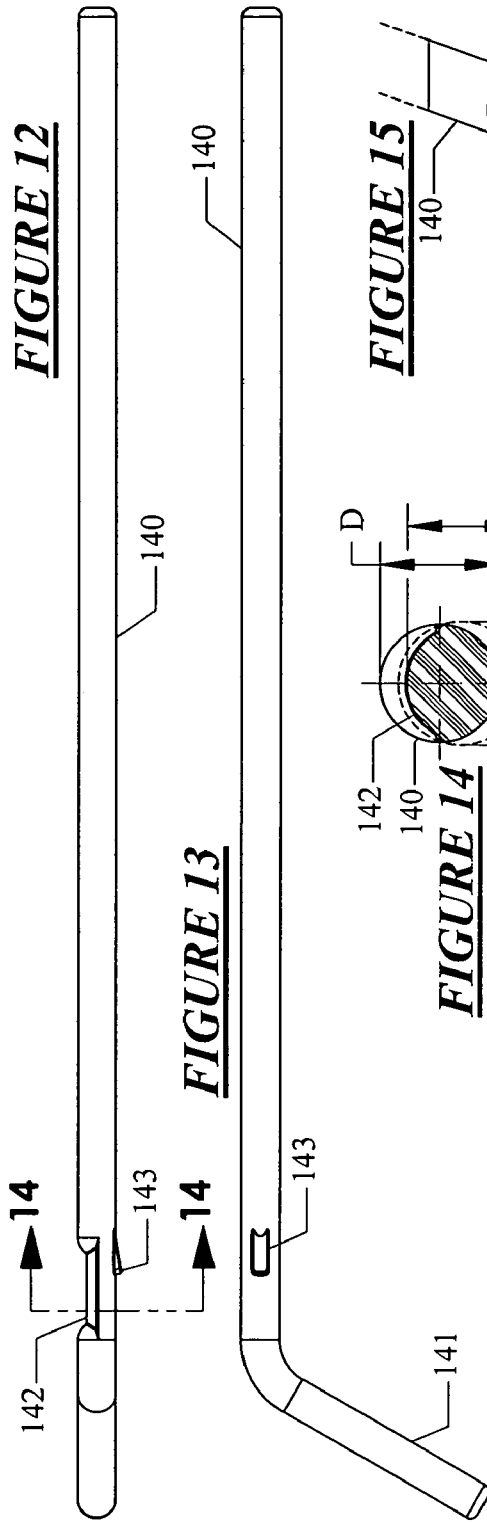
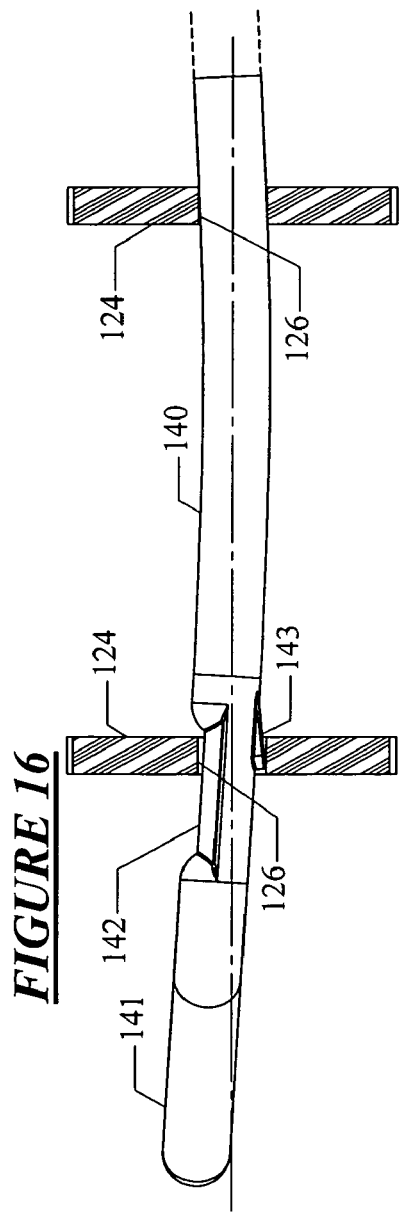

STORAGE APPARATUS FOR LOCKING LOAD BARS DURING TRANSPORT

CROSS REFERENCE TO RELATED APPLICATIONS

The present application claims priority to pending U.S. patent application Ser. No. 60/759,859 filed Jan. 18, 2006 and entitled "Holder for Load Bars used in Trailers with E-Track System" submitted by inventor Matthew John Sopel.

BACKGROUND OF THE INVENTION

1. Field of the Invention

This invention relates to load handling devices for the trucking industry and more particularly to a stowage means for locking load bars.

2. Description of the Related Art

Locking load bars are in common use in the trucking industry for the purpose of preventing inadvertent shiftings of cargo during transportation. These load bars can be readily damaged if they are improperly handled following their use, and their unavailability because of damage can lead to operational delays or cargo damage.

The stowage of locking load bars and similar elongate hardware is a very old problem that has been solved in a variety of manners. U.S. Pat. No. 438,735 by C. A. and J. H. Miller, Oct. 21, 1890 discloses a rack for tools with multiple mounting slots on a backing with a reciprocable looped retention bar across the outlet of the slots. The retention bar is attached to a first side of the backing by a pin serving as a keeper. When the bar is pulled away from the outlet of the slots, stowed tools can be accessed. Extension of the bar through a close fitting opening on the second side of the backing permits selectably locking the bar in a position wherein the stowed tools cannot be removed from the slots. This device can be difficult to load, as the tools are not retained until the locking bar is engaged in the opening on the second side of the backing.

U.S. Pat. No. 2,657,889 by B. M. Smalley, Nov. 3, 1953 discloses a rack structure consisting of multiple spaced apart transverse ears mounted on a backing, wherein the ears are penetrated by coaxial holes on a single axis parallel to the backing. An elongated pin extends through the holes and serves to retain objects mounted on the pin and placed between the ears. The pin is retained by a cotter key, which is time consuming and often awkward to use. This rack structure is rigidly mounted on a support by semi-permanent fasteners.

U.S. Pat. No. 3,797,284 by G. W. Grossman, Mar. 19, 1974 consists of a pin mounted backing member having multiple offset transverse ears, wherein the ears are penetrated by coaxial holes on a single axis parallel to the backing near their distal ends. The pin is supported on a structural base and has its axis horizontal or with its outer tip slightly upturned. Each pair of adjacent ears, together with the backing, form a slot for engaging a tool or similar item for storage. When the backing member is engaged over the fixedly supported mounting pin, a lock can be inserted and diametrically placed at the outer tip of the mounting pin in order to retain items engaged in the slots. This device, while straightforward in construction, is somewhat difficult to load, particularly for more than one vertical item.

U.S. Pat. No. 4,662,805 by C. Tamez et al., May 5, 1987 describes a device specifically intended to store locking load bars in a vehicle. The device is permanently or semi-permanently mounted in a vehicle. It consists of a base that provides a receptacle for engaging multiple vertical load bars on their lower ends, a vertical support, and an upper holder having multiple slots on a backing bar. A hinged closure plate with a latch means provided serves to retain the load bars in the slots of the upper holder. The closure plate may have a vertical axis or a horizontal axis hinge. This device is heavy and configured for rigid permanent or semi-permanent mounting.

U.S. Pat. No. 5,052,601 by R. E. Carter, et al., Oct. 1, 1991 describes a device for the horizontal storage of multiple locking load bars. The device consists of two identical dependent spaced apart vertical support plates having multiple horizontal laterally opening slots on an outward side. Each plate has a horizontal axis hinged closure plate lapped onto and mounted at either an upper or a lower end of the parallel slots. The length of the closure plates is the same as that of the support plates, and at the unhinged end of the closure plate is an aperture that aligns with a corresponding aperture in its support plate for locking. The closure plates may have slots corresponding to those of the support plates. Loading and unloading of the locking load bars into the slots is simple, but the permanent mounting of the storage device itself is relatively complex.

U.S. Pat. No. 5,060,810 by G. Jones, Oct. 29, 1991 discloses a device very similar to the device described in U.S. Pat. No. 5,052,601. The device consists of two identical spaced apart elongate support members having multiple laterally opening slots on an outward side. Each support member has a horizontal axis hinged closure member mounted to be coplanar with the support member at a first end of the parallel slots. The length of the closure members is the same as that of the support members, and the closure members have slots corresponding to those of the support members. At the unhinged second end of the closure member is an outwardly extending tang having a transverse hole. A swinging loop hinge mounted in a transverse hole at the second end of each support member may be rotated to engage over the tang so that a lock can be inserted through the tang hole. The slots are lined with resilient inserts for protection of the locking load bars. Loading and unloading of the locking load bars into the slots is simple, but the permanent mounting of the storage device itself is relatively complex.

U.S. Pat. No. 5,405,226 by J. W. Daves, Apr. 11, 1995 consists of two vertical spaced apart wall mounted troughs having opposed open sides adjacent their vertical mounting surface. The upper end of a first trough has an outwardly opening horizontally hinged door on its side opposed to its mounting side. The second trough has a closed upper end. The distance between the interiors of the closed vertical sides of the troughs, which are perpendicular to the mounting wall, is slightly more than the length of the locking load bars to be stowed horizontally. The bars are inserted by first positioning the bar in a vertical plane inclined relative to the mounting surface for the support device. With the first end of the bar positioned in between the opposed troughs, the first end can then be moved to the outer side of the second trough that is perpendicular to the mounting surface. The second end of the bar is then entered into the first trough through its opened door. Unloading of the bars proceeds in a reverse manner to loading. The disadvantages of this device are first the unavoidable lifting and bending associated with unloading and loading bars into the device and second the possible entanglement of the unseparated bars in the troughs.

U.S. Pat. No. 5,435,473 by J. A. Larkum, Jul. 25, 1995 describes a set of equispaced vertical upwardly opening slotted tubes mounted on a base member. All of the slots are oriented the same direction and open perpendicularly to the vertical common midplane of the tubes. Offset towards the slots from the vertical common midplane of the tubes are coaxial horizontal holes penetrating the tube walls near the upper end of the slots. An elongated rod having a transverse bend at a first end and a diametrical through hole at a second end can be inserted to retain items in the tubes. The items are elongated members which can fit their ends into the tubes and which have radial projections intermediate to their length that can be engaged in the bottom of the slots and thereby entrapped by the elongated rod. In the case of locking load bars, the tubes for a structure of this type would typically be made much shorter than the heavy bars in order to minimize lifting during handling. The tubes would have to be sufficiently larger than the main body of the bars in order both to accommodate end fittings on the load bars and to ease stabbing and removal. As a result, using this device to store the load bars result in significant movement at the unrestrained upper ends of the bars.

U.S. Pat. No. 6,109,846 by J. E. Davis et al., Aug. 29, 2000 is for a device similar to a retractable seat belt. In one version of the device, it can be engaged both at its housing end and at its distal belt end to a standard E-track slot. The E-track system consists of elongated strips having a regular pattern of punched rectangular slots that may be selectably engaged and disengaged by comateable connectors. These E-track strips typically are mounted to vertical surfaces on the interior of van bodies so that load restraining members can be releasably mounted in available slots in the E-track strips.

U.S. Pat. No. 6,364,141 B1 by G. A. Ehrgott, Apr. 2, 2002 describes a system of brackets mounted to an E-track strip, using a spring-loaded release lever that is comateable to the E-track strip. The brackets shown can mount multiple objects in an array extending outwardly from the surface of the fitting engaged in the E-track. The brackets do not themselves retain the stowed members.

U.S. Pat. No. 6,394,327 B1 by R. Mietlicki, May 28, 2002 describes a device for the mounting of brooms, wherein the broom is provided with a tang at a first end for the engagement of the tang into the slot of a wall mounted lower member. The upper portion of the broom shaft is engaged between two spaced apart horizontally extending plate ears mounted to a wall at a first end and each having a coaxial distal transverse hole. The broom is provided vertical support and lateral location through engagement of its tang, while lateral restraint of the broom shaft is provided by the ears and a lock engaged through the holes of the ears. The required attachment of a tang to the stowed item is a significant disadvantage.

U.S. Pat. No. 6,736,300 B2 of R. Deakin, May 18, 2004 describes a set of U-shaped brackets with their open ends extending upwardly mounted onto a frame atop a vehicle. The brackets are connected to the frame by means of U-bolts engaged around the frame and extending through holes in the bottoms of the brackets. After an elongated item or an elongated portion of an item of is stowed nested into the brackets, a keeper pin is inserted in coaxial transverse holes in the opposed upper ends each of the brackets. The keeper pins are L-shaped with a bend at a first end and a diametrical hole at a second end. The keeper pin itself is retained by a cotter pin or spring pin in its diametrical hole. The use of the cotter or keeper pins is inconvenient, since such small separate items are easily lost or misplaced.

While this particular area of art is very old and has a lot of potential solutions represented by the cited patents, it is evident that there is a need for a stowage means for elongated items such as locking load bars that is easy to load and unload.

Additionally, there is a need for a stowage means that can be attached to existing systems of the E-track mountings installed in trucks and vans.

Furthermore, there is a need for stowage means for multiple similar items wherein the items can be installed sequentially with the previously stowed items fully retained so they will not fall over.

SUMMARY OF THE INVENTION

The present invention relates to a readily installable and removable stowage means for multiple elongate locking load bars and other elongated items for use inside the bodies of trucks and vans. The structure of the present invention is such that it can be mounted readily on the commonly preexisting E-track slotted tracks in the cargo spaces of commercial fleet trucks.

A first aspect of the present invention is a stowage means for elongated items wherein the assembly consists of one or more wall mountable brackets having outwardly extending arms which form slots for receiving elongated members, selectably installable and retainable mounting means positioned on opposed ends of the brackets, and selectably operable locking retaining means engagable in the brackets for retaining the stowed elongated items within the slots.

A second aspect of the present invention comprises a storage device having (a) a support bracket with a base, a plurality of bracket arms extending perpendicularly from the base, and a pin hole penetrating each bracket arm distal to the base, wherein the pin holes in the bracket arms are coaxially aligned; and (b) a self-locking retainer rod threadable through the coaxially aligned pin holes.

A third aspect of the present invention is storage device comprising: (a) a support base having two engagement tabs outwardly extending from the support base along a longitudinal axis of the base, one tab extending from a first end of the base and a second tab extending from a second end of the base; (b) a plurality of bracket arms extending perpendicularly from the base, the bracket arms having coaxially aligned pin holes distal to the base; and (c) a self-locking retainer rod threadable through the coaxially aligned pin holes.

A fourth aspect of the present invention is a storage device comprising: (a) a support base having two engagement tabs outwardly extending from the support base along a longitudinal axis of the base, one tab extending from a first end of the base and a second tab extending from a second end of the base, wherein each engagement tab has a bendable inclined cantilevered locking tab projecting beyond a surface of the support bracket; (b) a plurality of bracket arms extending perpendicularly from the base, the bracket arms having coaxially aligned pin holes distal to the base, wherein the pin holes are centrally located in each bracket arm proximal to a distal end of the bracket arm and have an axis parallel to a longitudinal axis of the base; and (c) a self-locking retainer rod threadable through the coaxially aligned pin holes, wherein the retainer rod has a cylindrical main body, the main body having a handle at a first end and a reduced surface section proximal the first end and a displacer ridge on an opposed side of the main body diametrically opposite to the reduced surface section.

A fifth aspect of the present invention is a storage device comprising: (a) a support base having two engagement tabs outwardly extending from the support base along a longitudinal axis of the base, one tab extending from a first end of the base and a second tab extending from a second end of the base, wherein each engagement tab has a bendable inclined cantilevered locking tab projecting beyond a surface of the support bracket; (b) a plurality of bracket arms extending perpendicularly from the base, the bracket arms having a lateral surface that tapers outwardly such that a first distance between a pair of adjacent brackets proximal to the base is greater than a second distance between the pair of adjacent brackets at a distal end to the base, wherein the bracket arms have coaxially aligned pin holes centrally located in each bracket arm proximal to the distal end of the bracket arm with an axis parallel to a longitudinal axis of the base; and (c) a self-locking retainer rod threadable through the coaxially aligned pin holes, wherein the retainer rod has a cylindrical main body, the main body having a handle at a first end and a reduced surface section proximal the first end and a displacer ridge on an opposed side of the main body diametrically opposite to the reduced surface section.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is an oblique view of an end of the support bracket of the storage device, wherein the view is from the side of the bracket adjacent the E-track strip.

FIG. 7 is a longitudinal cross-sectional view of one end of the support bracket of the storage device installed in a selectably operable latch and retained thereon by a latch retainer.

FIG. 8 is a longitudinal cross-sectional view corresponding to FIG. 7, with the latch retainer depressed and passing through the latch in the longitudinal axial direction of the support bracket. The latch is shown in passage directly adjacent the latch retainer.

FIG. 9 is a transverse cross-sectional view in the direction of the longitudinal axis of the E-tack strip through a slot of the E-track and adjacent the side of a latch, in which the latch is installed on the end of the support bracket as shown in FIG. 7. The latch is shown engaged with the E-track slot so that it serves to mount the support bracket to the E-track strip.

FIG. 10 is a view corresponding to FIG. 9, but showing both the release lever of the latch in a depressed position and the necessary rotation to permit disengagement of the body of the latch from the E-track slot. The body of the latch is shown attached to the end of the support bracket end.

FIG. 11 shows an oblique view of the support means wherein the latch on the far end of the support bracket is engaged with the E-track, while the latch on the near end is disengaged from the E-track as shown in FIG. 10. It should be noted that the body of the support bracket is twisted in order to permit operation of one latch at a time.

FIG. 12 is a view in a first direction perpendicular to the longitudinal axis of the self-latching retainer rod used to retain load bars in the support bracket, as seen in operation in FIGS. 1 and 2.

FIG. 13 is a view of the self-latching retainer rod in a second direction perpendicular to both the longitudinal axis of the retainer rod and the view direction of FIG. 12.

FIG. 14 is a transverse cross-sectional view of the retainer rod taken on the line 14-14 of FIG. 12. FIG. 14 shows details of the self-latching structures of the retainer rod.

FIG. 15 is an oblique view of the handle end of the retainer rod in which the self-latching structures are seen from a direction more nearly aligned with the longitudinal axis of the retainer rod.

FIG. 16 is a partial cross-sectional view of the retainer rod engaged in two of its mounting holes in the support bracket. The retainer rod is shown being bent longitudinally in order to permit its axial passage through one of the mounting holes.

FIG. 17 shows a horizontal cross-sectional view taken at midheight of a portion of a mounted support bracket with a vertical load bar engaged and retained within one of its slots.

DESCRIPTION OF THE PREFERRED EMBODIMENTS

The invention relates to a readily installable and removable stowage means for storing multiple elongate locking load bars and other elongated items for use inside the bodies of trucks and vans. The stowage means is readily and reversibly mounted on preexisting E-track slotted tracks in the cargo spaces of commercial fleet trucks. The stowage means includes one or more wall mountable brackets having outwardly extending arms that form slots for receiving elongated members. The stowage means is selectably installed using a latch engaged in the E-track slotted tracks and is retained by a latch retainer positioned on opposed ends of the brackets.

The stowage means includes a storage device used for temporarily organizing, supporting, and storing the locking load bars common in the trucking industry when not in use. Having a convenient simple, reliable storage device for the load bars places the load bars where they likely will not be damaged, trip a person unloading cargo, or forgotten and left behind. The storage device can also be used for supporting other items besides the load bars.

The storage device includes a support bracket, an associated latching means, and a retaining means. The storage device is selectably installed and removed from the E-track strips frequently mounted inside the cargo compartments of trucks and vans. Alternatively, short lengths of E-track strips can be provided for attachment to the interior of a cargo compartment for the mounting of the storage device in the event that such strips are either not installed or have been installed in unsuitable positions.

One or more storage devices may be vertically aligned and mounted in a cargo compartment of a truck, van, or trailer to restrain the load bars placed in the storage device(s) against lateral movement. Typically the brackets of the storage device are mounted in pairs to support the upper and lower ends of multiple stowed load bars against lateral movement whenever the load bars have their lower ends resting on the floor of the cargo compartment.

A major advantage of the storage device of the present invention is its ease of assembly and simple installation and removal from the cargo compartment. Another advantage of the present invention is the simple one-hand operation of the self-latching retainer rod used to hold the load bars in the storage device.

General Description of Storage Device

Figure 1:
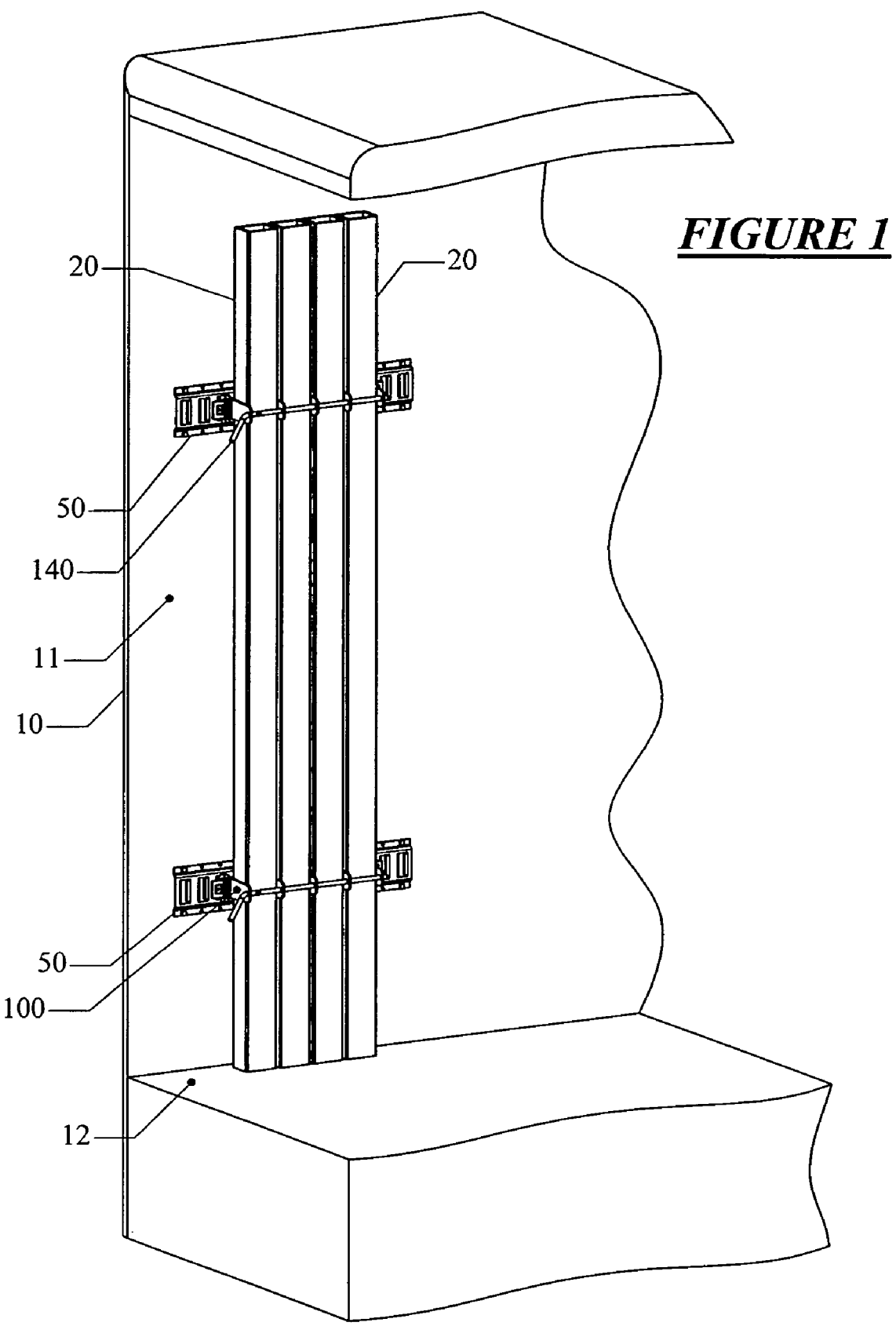
FIG. 1 is an oblique view of the rear of a van with its doors open and in which the storage device for locking load bars of the present invention is mounted on an internal wall.

Referring to FIG. 1, a partial sectional view of the rear of a cargo compartment 10 of a vehicle is seen. Two of the storage devices 100 of the present invention are shown mounted to a pair of vertically aligned and spaced apart horizontally extending E-track strips 50, which are in turn mounted on a vertical side wall 11 of the cargo compartment 10. The E-tracks 50 typically would be long pieces preinstalled in the cargo compartment 10 prior to its delivery to the trucking operator. However, they are shown herein as the short pieces, which would be provided together with the storage device 100 in the event of the E-tracks being absent, or the preexisting E-tracks being poorly positioned for the purposes of mounting the storage device 100.

In FIG. 1, each storage device has a retainer rod 140 engaged so that a set of multiple load bars 20 is laterally retained in the storage device 100. The load bars 20 are positioned vertically in close fitting slots of the support bracket with their lower ends bearing on the floor 12 of the cargo compartment 10. The load bars 20 are shown herein as hollow rectangular cross-section tubes having square ends. Generally, commercially available load bars have a selectably operable latching means, suitable for engaging E-tracks mounted inside the cargo compartment 10, on the opposed ends of each load bar; however, for the sake of simplicity these latches are not shown herein.

Figure 2:
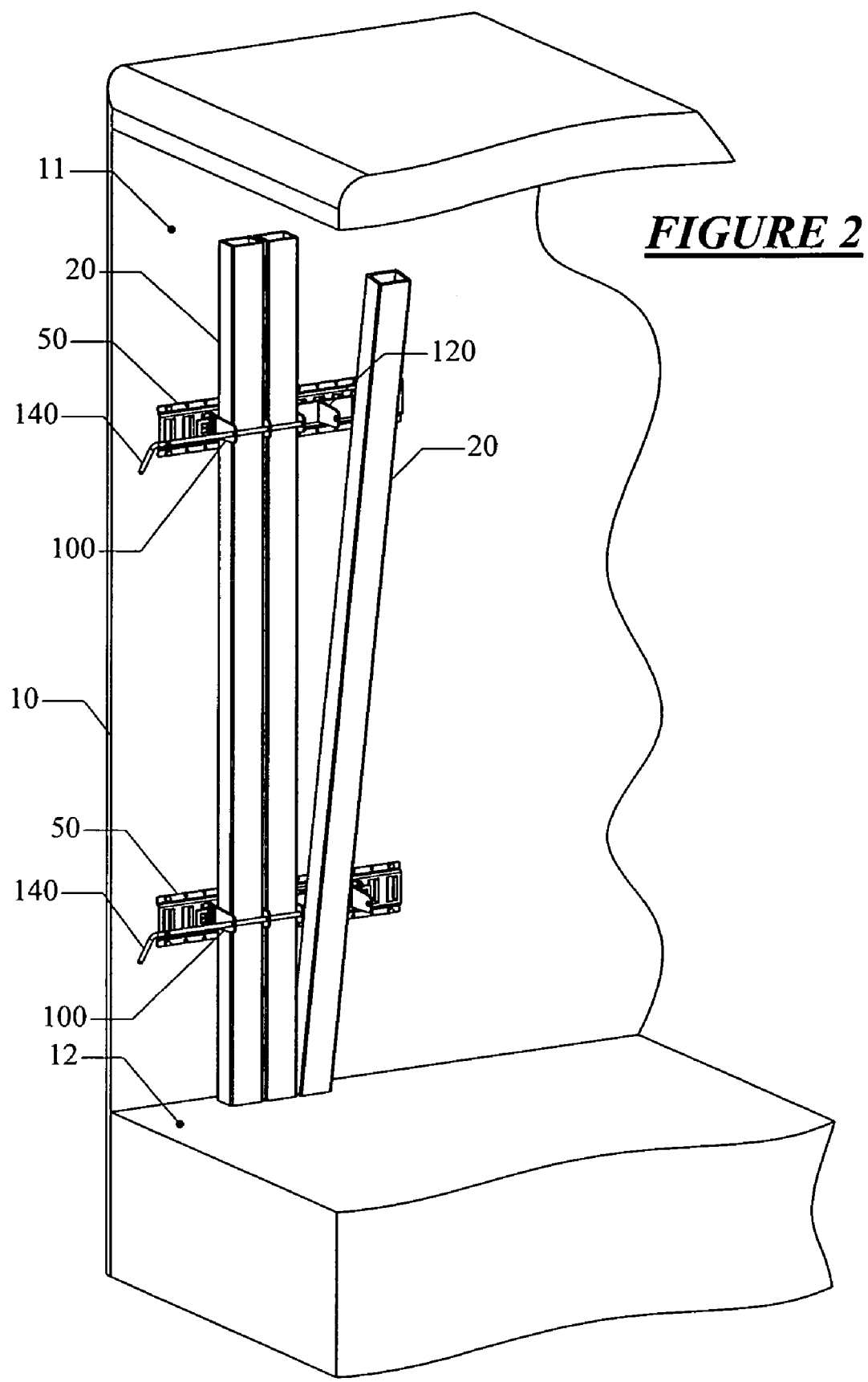
FIG. 2 is a view corresponding to FIG. 1, but with one of the locking load bars removed and another in the process of being removed.

Referring to FIG. 2, the cargo compartment 10 is shown with one of the load bars 20 of FIG. 1 removed and another load bar being pivoted about its lower end to swing into or out of engagement between corresponding slots of the upper and lower support brackets 120 of the storage device 100. The retainer rods 140 are shown withdrawn sufficiently so that the load bar 20 being rotated in FIG. 2 can freely enter or leave the slots of the support brackets 120, but the remaining stowed load bars are still kept in place by the retainer rods being engaged in their respective support brackets.

Figure 3:
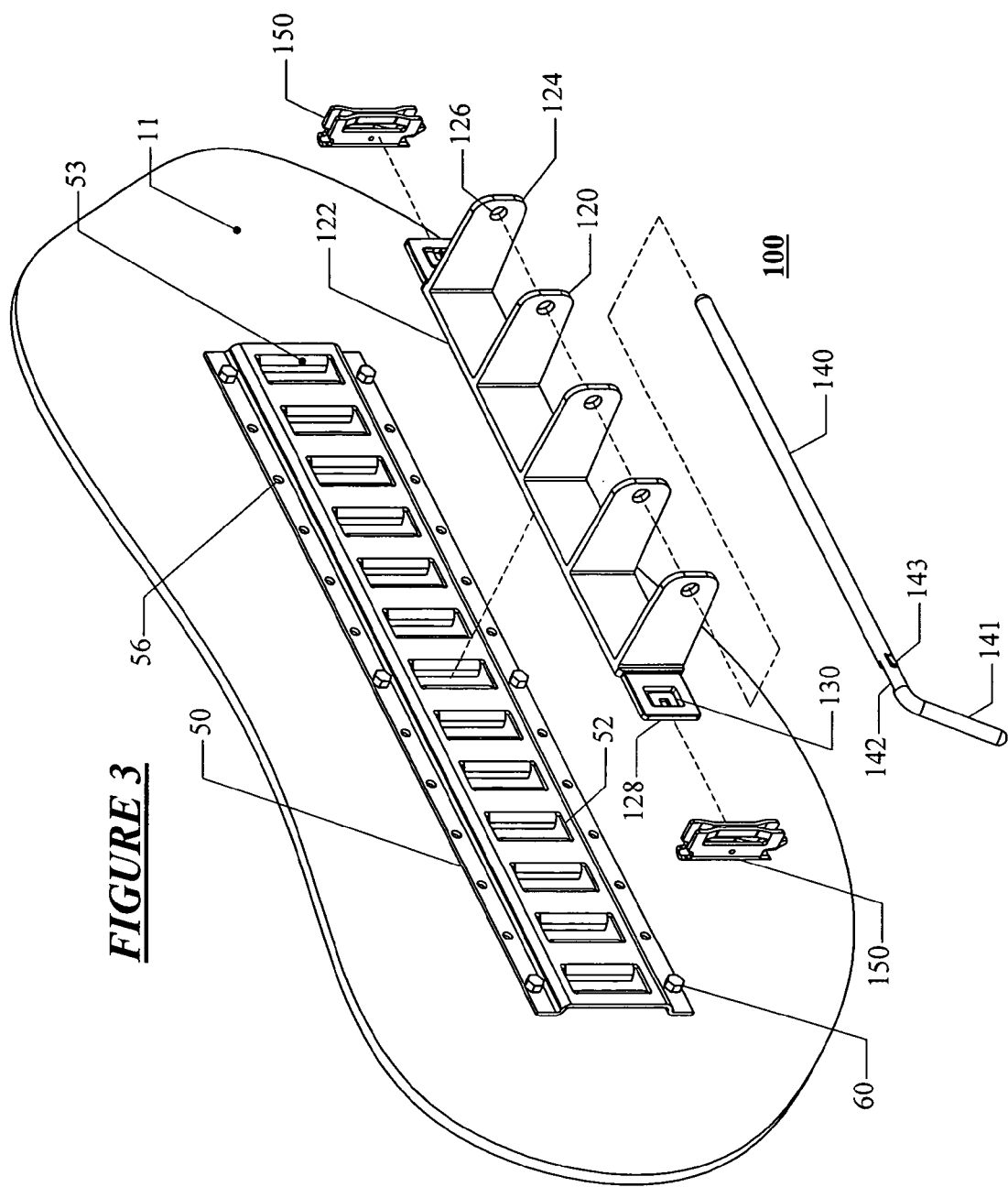
FIG. 3 is an oblique exploded view of the storage device of the present invention showing a fragment of a supporting wall having a segment of E-track strip mounted thereon for attachment of the storage device.

FIG. 3 shows an exploded view of the storage device 100, along with an E-track strip 50 mounted on the interior wall 11 of the cargo compartment 10. Storage device 100 consists of a support bracket 120, two E-clips 150, and a retainer rod 140. Commercially available E-clips 150 can be selectably engaged and disengaged with the engagement tabs 128 at the opposed ends of the support brackets 120. The same E-clips 150 are then used to connect the support brackets 120 to their E-track strips 50.

The E-Tracks

The commercially available E-track strip 50 consists of a rolled or press-broken strip of sheet steel having regularly spaced punched mounting slots 52 arrayed down its length. The cross-section of the E-track 50 has a longitudinal midplane of symmetry and two narrow coplanar opposed mounting flanges which are perpendicular to the midplane and offset from a wider central planar portion of the strip. The opposed flanges serve as mounting surfaces for the E-track strip 50 and are provided with regularly spaced circular holes 56 down their lengths for engagement by mounting screws 60. The mounting slots 52 are symmetrically placed on the central strip of the E-track 50.

The flanges of the E-track strip 50 are each joined to the central planar portion of the strip by a short bent segment. Each mounting slot 52 of the E-track 50 is punched so that its opposed sides parallel to the midplane have reliefs at their ends, while two antisymmetrical tabs 53 are formed by cutting the metal between the opposed slot sides on the transverse slot midplane that is normal to the midplane of symmetry of the slot. The antisymmetrical tabs 53 are bent inwardly in the direction of the mounting flanges, so that their sides and edges establish slot sides transverse to the longitudinal midplane of symmetry of the E-track 50.

As shown in FIG. 3, the E-track 50 is mounted to the sidewall 11 of the cargo compartment 10 by means of hex-headed screws 60. If the sidewall 11 is plywood, then lag or wood screws are used, while self-tapping or self-drilling and tapping screws are used for a sheet metal sidewall. The E-track 50 is mounted horizontally so that its mounting slots 52 are in a regularly spaced horizontal array extending down the side wall 11 of the cargo compartment 10.

The Support Bracket

In FIG. 3, the structure of the support bracket 120 can be seen. The support bracket 120 has a base 122 having an elongated rectangular cross-section, with the cross-section relatively wide in the vertical direction and narrow in the horizontal direction. The thickness of the cross-section in the horizontal direction typically is on the order of 0.25 to 0.5 inch (6 to 13 mm), while typically the cross-section is 2 to 4 inches (50 to 100 mm) in the vertical direction.

The size of the cross-section of the base 122 is determined on the basis of allowable material stress, size of the members to be retained, and fabrication considerations such as warpage. The length of the base 122 is dependent on the size and number of load bars 20 to be engaged and retained by the support bracket 120. Additionally, the distance between the transverse shoulders at the distal ends of the rectangular prismatic body 122 is equal to the distance between an integral number of slots 52 on an E-track 50 minus the width of an E-clip 150, or about ⅛ inch (3 mm).

Extending horizontally outwardly and perpendicularly to one vertical flat front face of the base 122 of the support bracket 120 are multiple equispaced vertical bracket arms 124. Each pair of adjacent bracket arms 124 and the portion of the base 122 extending between the adjacent bracket arms thus forms a slot that is open on the side opposed to the base 122. The spacing between the bracket arms 124 is such that the slot is a slip fit to the load arm 20 that is to be stored within the slot. The bracket arms 124 have rectangular cross-sections and transverse ends.

The bracket arms 124 are as wide as the base 122 at the point of their connection thereto, but the bracket arms may taper in the vertical direction toward their distal ends. The bracket arms 124 are generally as wide as, or slightly thinner than, the base 122 in the direction of the horizontal longitudinal axis of the base. Again, the bracket arms 124 may slightly thin outwardly from their attachment to the base 122. The outer tips of the bracket arms 124 are rounded to reduce the potential of injuring the loading personnel.

Centrally located in the end of each of the bracket arms 124 adjacent to its distal end is a single circular horizontal pin hole 126 having an axis parallel to the base 122. All of the pin holes 126 in the bracket arms 124 are coaxial, and the holes are a slip fit for a retainer rod 140. The separation of the axis of the holes 126 from the nearer front flat surface of the base 122 is such that a load bar 20 engaged in a slot of the base between two adjacent bracket arms 124 is closely supported by a retainer rod 140 inserted in the holes 126. Due to the pin hole positioning relative to the base 122, some clearance between an inserted retainer rod 140 and a retained load bar 20 is provided to allow for manufacturing tolerances and necessary running clearances for insertion of the rod 140 in the holes 126 when the load bar 20 is present.

The base 122 of the support bracket 120 extends symmetrically outwardly in the direction of its longitudinal axis slightly beyond the outside end of the outer bracket arms 124, where it ends in a transverse vertical shoulder. As seen in FIGS. 6-8, adjoined to each of those transverse shoulders is an engagement tab 128 outwardly extending in the direction of the horizontal longitudinal axis of the base 122. Engagement tab 128 has a rectangular cross-section slightly narrower and about 0.05 to 0.125 inch (1.27 to 3 mm) thinner than base 122. Tab 128 is symmetrically positioned vertically with the horizontal midplane of the cross-section of the base and with a vertical face coplanar with the rear vertical face of the base opposite where the bracket arms 124 are mounted.

In the central portion of each engagement tab 128 is located a C-shaped through cut 129 having a narrow kerf width. The C-shaped cut 129 has its symmetrical parallel arms extending outwardly away from the center of the support bracket 120, while the interconnecting section of the C extends vertically transverse to the longitudinal axis of the support bracket 120. Integral cantilevered locking tab 130, which extends toward the center of support bracket 120, is formed on its outer perimeter by the cut 129. The locking tab 130 is inclined relative to the base 122 of the support bracket 120, so that the distal tip of tab 130 projects beyond the planar rear surface of the support bracket in the direction opposed to the outward extension of the arms 124. The distal transverse tip of the locking tab 130 is thus normally exposed and can serve as an abutting face.

The distance from the distal transverse tip of the locking tab 130 to the transverse shoulder at the outer end of the main portion of the body 122 of the support bracket 120 where the engagement tab 128 is attached is slightly more than the width of an E-clip 150. This permits some additional axial travel relative to the shoulder for a retained E-clip 150 mounted on the engagement tab, with the additional axial travel providing compensation for manufacturing variations in the length of the body 122, the width of the E-clip 150, and spacings of the slots 52 of the E-tracks 50.

In order to permit passage in the longitudinal axial direction of support bracket 120 of any item closely engaged with the cross-section of the engagement tab 128, it is necessary to inwardly depress locking tab 130. This inward depression of locking tab 130 requires that the locking tab be bent in flexure so that it is displaced in the direction of the outward extension of the bracket arms 124. A rectangular through hole is positioned centrally in the locking tab 130 in order to reduce the bending stiffness of the cantilevered beam cross-section of tab 130. The bending stiffness of the locking tab 130 is further reduced by thinning it relative to engagement tab 128. A raised C-shaped bearing surface 132 is symmetrically positioned with and set inwardly from the C-shaped cut 129 on the normally outwardly extending side of the locking tab 130. Bearing surface 132 is integral with locking tab 130 and projects outwardly in the direction normal to the face of the locking tab that is opposed to the bracket arm side of the support bracket 120. Bearing surface 132 tapers from where its parallel arms are joined to the middle section of the C to zero thickness at its distal tips.

The material of construction for the support bracket 120 can be of various compositions, but the preferred material would be a thermoplastic such as a glass-filled nylon, an ultrahigh molecular weight (UHMW) polyethylene, a high-density polypropylene, or a polyurethane. The part could be injection molded in nylon or cast in polyurethane. For fabrication in any of these materials, the support bracket would be formed in one integral piece, with liberal filleting at the interconnection of the bracket arms 124 and the engagement tabs 128 to the base 122 and radiusing of the corners of the C-shaped cut 129. Draft is generally required for injection molding or casting, so the bracket arms 124 would then be provided with outwardly converging tapers for release from their mold, as can be seen in the cross-sectional view of FIG. 17.

As can be seen in FIG. 17 for a molded or cast support bracket 120, the open side of the slot formed between two adjacent bracket arms 124 is wider than the closed side adjacent the base 122. This is because of the draft angle of the lateral surfaces of the bracket arms indicated by the single-side taper A. This inward constriction of the slots formed by the support bracket 120 permits easy entry of the load bars 20 into the slot, but closer retention with attendant lower shock loads when the bar is fully engaged in the slot.

The choice of thermoplastics for the construction of the support bracket 120 can provide reasonable strength, along with extensive deflection capability to aid in resisting permanent deformation due to impacts which commonly occur during the passage of cargo past the mounted storage device 100 of the present invention. Additionally, as will be described later in more detail when the operation of the invention is discussed, the low torsional stiffness of the base 122 about the longitudinal axis of the support bracket 120 offers the benefit of easier installation and removal of the storage device 100 from an E-track mounting. Further, the low bending stiffness of the locking tabs 130 greatly eases their manual depression for permitting simple engagement and disengagement of the E-clips 150 onto the engagement tabs 128 of the support bracket 120. The bending and torsional elastic moduli for thermoplastics are generally about one order of magnitude less than for steel, so that for the same structural dimensions, the forces required to deflect a thermoplastic member a fixed amount are about one tenth of those required for a similar steel structure.

The E-Clips

Figure 4:
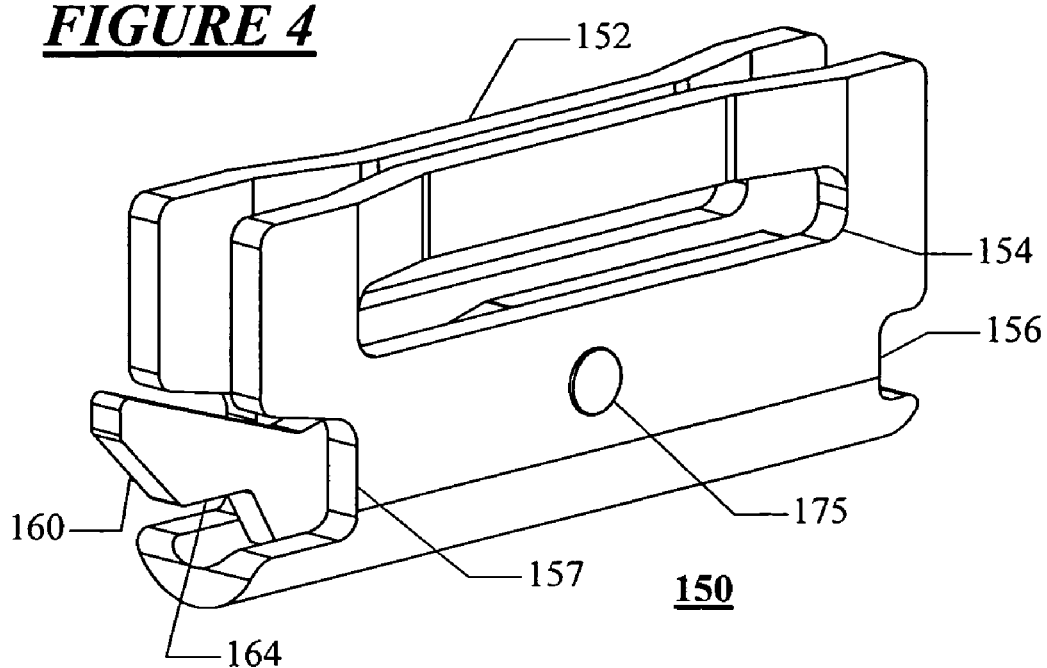
FIG. 4 shows an oblique view of the selectably operable latch used for engagement and disengagement of the stowage means with the E-track mounting strip.
Figure 5:
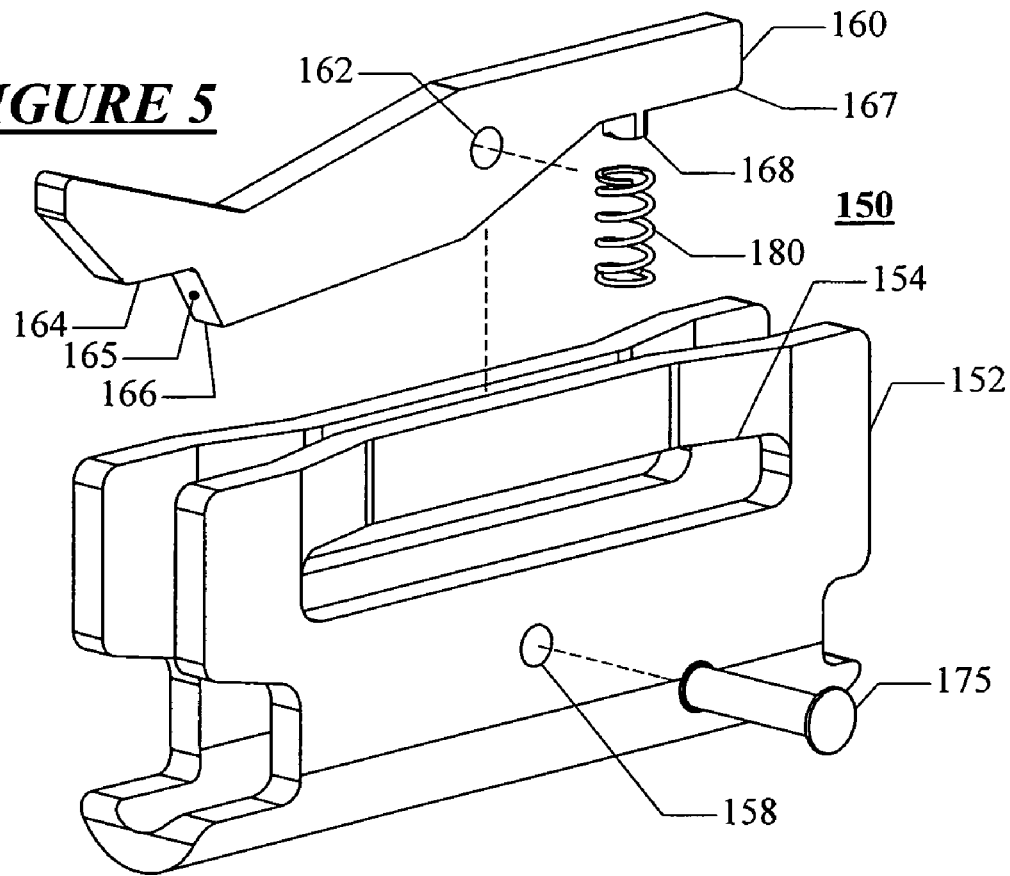
FIG. 5 is an exploded view of the latch shown in FIG. 4.

The structure of the commercially available E-clips 150 is shown in an oblique view in FIG. 4 and a comparable exploded view in FIG. 5. Various E-clip conformations are commercially available, as can be seen from the U.S. Pat. Nos. 6,109,846 and 6,364,141 B1 cited earlier herein, but the preferred configuration for the present invention is described here. An E-clip consists of a body 152, a pivot pin 175, a latch 160 that is pivotable about the pivot pin, and a bias spring 180 for urging the latch to its latching position.

The body 152 of the E-clip is formed from sheet steel with a thickness of approximately 0.12 inch (3 mm). The E-clip body 152 is bent into an U-shape symmetrical about a midplane parallel to the bend axis with the width of the U-shape a loose fit between the antisymmetrical tabs 53 of the slots 52 of the E-track 50. Parallel to the axis of the bend and adjacent the parallel outer ends of the U-shape, the sides of the body 152 are penetrated by symmetrical rectangular mounting slots 154 elongated in the direction of the bend axis. The mounting slots 154 are a close fit to the transverse cross-section of the engagement tabs 128 of the support brackets 120. The central portions of the opposed outer ends of the U-shape of the body 152 outward of the mounting slots 154 are bent inwardly but parallel to the bend axis of the body.

A first side of the bent E-clip body 152 located at a first end of the bend axis is provided with symmetrical rectangular first notches 156 which extend inwardly roughly parallel to the bend axis. These notches 156 are only about 0.18 inch (4.7 mm) deep and provide a loose fit to the untabbed edges of the slots 52 of the E-track 50. On the opposed second end of the E-clip body 152 are located symmetrical second notches 157 which are deeper than the first notches 156. The depth of the second notches 157 is such that the distance from the inward end of the second notches to the first end of the E-clip body 152 is slightly less than the distance between the untabbed edges of the slots 52 of the E-tracks 50. The edges of the second notches 157 which are adjacent the bottom of the U-shape of body 152 are coplanar with the corresponding edges of the first notches 156, while the opposed edges of the second notches outwardly diverge. Located at approximately midlength of the E-clip body 152 and spaced somewhat outwardly from the bend axis are symmetrical coaxial transverse pin holes 158 which serve to mount the pivot pin 175 of the E-clip 150.

As best seen in FIG. 5, the latch 160 of the E-clip 150 is an elongated irregularly shaped member made from flat steel sheet and having a centrally located transverse pin hole 162 which is engaged by pin 175 so that the latch can be pivoted thereby. At a first end of the latch 160 is located an extended tang which extends outwardly from the E-clip body 152 when the latch is mounted therein by pin 175. The tang can be engaged manually to induce the installed latch 160 to pivot about the pin 175.

On the lower side of the tang is a two-sided notch that has on a first side a flat surface 164 which is radially positioned from the axis of the pin hole 162. The second side 165 of the notch is inclined to the first side 164 so that the notch is obtuse. The location of the second side 165 of the notch of the installed latch 160 from the pin hole 162 is such that when the E-clip 150 has its first notch 156 abutting one of the untabbed edges of a slot 52 of the E-track 50, the second side 165 of the notch can be either abutted or nearly abutted against an opposed untabbed edge of the slot 52 or the E-track. The intersection of the second side 165 of the notch with the bottom side of the latch 160 forms an abutment edge which serves as a rotational stop in a first direction when engaged against the inside bottom of the U-shape of the body 152 of the E-clip 150.

A similar edge 167 is formed at the second end of the latch 160 where that end intersects the bottom side of the latch. Edge 167 serves as a travel stop for abutment against the inside bottom of the U-shape of the body 152 of the E-clip 150 when the trigger 160 is rotated in a second direction. On the bottom side of the latch 160 approximately halfway between pin hole 162 and the second end is located a downwardly extending spring projection 168. Helical spring 180 fits over the spring projection 168 at its first end and bears against the bottom side of latch 160, while it also bears at its second end against the inside bottom of the U-shape of the body 152 of the E-clip 150. Spring 180 thus biases latch 160 to rotate in its first direction where edge 166 is bearing against E-clip body 152.

The pivot pin 175 has a head on a first end and a right circular cylindrical body which can be inserted into hole 158 and pin hole 162 of the latch 160 after the latch with its spring 180 are positioned between the legs of the U-shape of the E-clip body 152. The second end of the pin 175 is then peened over after assembly of the E-clip 150 to retain the pin.

Referring to FIG. 9, an E-clip 150, mounted on an engagement tab 128 of a support bracket 120, is shown in engagement with a slot 52 of an E-track strip. FIG. 10 shows the E-clip, shown in FIG. 9, in partial disengagement from the E-track strip. For FIG. 9, the first notch 156 of the body 152 of the E-clip 150 is engaged with a first untabbed side of the slot 52, while the lower side of the second notch 157 is engaged with the interior of the untabbed side of the slot 52. The second side 165 and the first side 164 of the notch of the latch 160, biased by spring 180, are also in close proximity to the second opposed untabbed side of the slot 52 while the external lateral sides of the E-clip body 152 are closely confined by the tabs 53 of the slot 52. Whenever the E-clip 150 is latched into the slot 52 of the E-track 50, as shown in FIG. 9, the support bracket 120 mounted on the E-clip is also mounted to the E-track.

For the unlatching of the E-clip from the E-track shown in FIG. 10, it is necessary to manually press the tang of the latch 160 upwardly against the bias of spring 180 so that both the first side 164 and the second side 165 of the latch 160 are brought out of proximity to the second untabbed side of the slot 52 of the E-track 50. Following this, the E-clip 150 is then shifted so that the interior transverse end of the second notch 157 of the E-clip body 152 bears against the second untabbed side of the slot 52 of the E-track 50. This shift of the E-clip body 152 in the slot 52 disengages first notch 156 of the E-clip body from the first untabbed side of the slot so that the E-clip 150 then can be rotated about the second untabbed side of the slot and brought clear of the slot on the first end of the E-clip body. This action is illustrated in FIG. 10. From the position shown in FIG. 10, the E-clip 150 with its attached support bracket 120 is then shifted toward the first untabbed edge of the slot 52 and then is lifted upwardly clear of the slot to complete unlatching. The engagement of the E-clip 150 with the slot 52 of the E-track 50 is done using the reverse of the unlatching operation described immediately above.

The Retainer Rod

The retainer rod 140 of the present invention, shown in detail in FIGS. 12 to 15, is an elongate right circular cylindrical rod having a bent shank 141 at a first end to serve as a handle and a chamfered or filleted distal tip at the second end. The elongated right circular cylindrical portion of the retainer rod 140 is a slip fit to the pin holes 126 in the ends of the bracket arms 124 of the support bracket 120.

Close to the first end of the right circular cylindrical main body of the retainer rod is a short reduced surface section 142 having an axial length equal to approximately 3 to 6 thicknesses of an individual bracket arm 124 at the location of its through hole 126. As can be seen in the cross-sectional view of the retainer rod at the reduced surface of FIG. 14, the reduced surface 142 is symmetrically formed by a right circular cylindrical surface having the same diameter as that of the main body section of the retainer rod 140, but with its axis offset parallel to one side of the longitudinal axis of the retainer rod. A pair of diametrically opposed radially positioned flats interconnects the reduced surface 142 with the main cylindrical surface of the retainer rod 140. At either of the ends of the reduced surface 142, generous fillets smoothly transition between the reduced surface and the main cylindrical surface.

On the opposed side of the retainer rod diametrically opposite to the reduced surface 142 and symmetrically positioned relative to the midplane of symmetry for the reduced surface is a tapered displacer ridge 143. The transverse cross-sectional view of the displacer ridge 143 shows it to have parallel opposed sides equally offset from the midplane of symmetry for the reduced surface 142 and an outer surface with the same radius as the main cylindrical portion of the retainer rod 140. The axis of the displacer ridge 143 is located on the center of the outer surface of the ridge and is inclined at a small acute angle relative to the longitudinal axis of the retainer rod 140.

The displacer ridge 143 begins its emergence beyond the cylindrical surface of the main body of the retainer rod 140 at or near the end of the reduced surface 142 that is toward the second end of the retainer rod. The displacer ridge 143 increasingly extends radially outwardly in the direction of the first end of the retainer rod 140, but it ends with an abrupt slightly radiused transverse shoulder so that the total length of the displacer ridge 143 is approximately 30 to 40 percent of the axial length of the reduced surface 142. The distance Y in the transverse plane, as shown in FIG. 14, is the maximum distance from the outer cylindrical surface of the displacer ridge 143 to the reduced cylindrical surface 142. Distance Y must be somewhat less than the diameter of the pin holes 126, indicated as D in FIG. 14, in order to permit the retainer pin to pass through the pin holes when the longitudinal axis of the retainer rod 140 is locally displaced from the centerline of a pin hole.

A material having a low bending modulus of elasticity is chosen for the construction of the retainer rod 140 in order to ensure that the rod can be manually bent as shown in FIG. 16. For instance, a glass filled nylon offers sufficient strength with an appropriate range of bending elastic moduli to permit using a retainer rod having a diameter on the order of 7/16 to 9/16 inches (11 to 14 mm), although other thermoplastics may also be suitable.

The application of bending moment to the retainer rod 140 by means of manually displacing the shank 141 of the rod laterally is able to induce sufficient curvature in the centerline of the rod so that the obstruction constituted by the displacer ridge 143 can pass through a pin hole 126 when the retainer rod is being withdrawn. However, without the suitable application of bending moment, the axis of the retainer rod 140 remains coaxial with the holes 126, so that inadvertent withdrawal of the rod is prevented when the transverse shoulder of the displacer ridge 143 abuts the side of a bracket arm 124. Manually applying sufficient axial thrust or a combination of reduced axial thrust with bending to the shank 141 of the retainer rod 140 will cause the passage of the displacer ridge 143 through a pin hole 126 during insertion of the retainer rod.

Operation of the Invention

The operation of the storage device 100 of the present invention proceeds as described below. Two installation methods are described, with the operationally simpler installation method being described first.

A horizontally aligned E-track 50 is installed, as shown in FIGS. 1 and 2, on a vertical surface 11 of a cargo compartment at a suitable height for use with a single storage device 100. In the case when two or more vertically aligned storage devices are to be used, a sufficient number of E-tracks are installed at the desired heights. The E-tracks used to mount the storage devices may be preinstalled into the cargo compartment, or if this is not the case, then separate short E-tracks 50 are suitably mounted using appropriate screws 60 engaged through the holes of the E-tracks and into the wall 11.

A single storage device 100 is sufficient for the expected loadings resulting for the case of vertical stowage of one to four locking load bars 20 which have hollow rectangular cross-sections and which individually weigh in the range of 40 to 60 lb (18 to 27 kg). The single E-track 50 for this single storage device 100 would be positioned approximately 75 percent of the length of the load bar 20 above the floor 12 of the cargo compartment 10.

In the event that the vehicle is to be operated on rough roads with four or more load bars, then a second E-track 50 and storage device 100 may be required at about 25 percent of the length of the load bar 20 above the floor 12, as illustrated in FIGS. 1 and 2. The lower end of the load bars 20 is assumed to bear on the floor 12. It should be noted that the support bracket 120 as shown herein is configured to accept up to four load bars, but it could be configured to accept any number of load bars or similarly shaped elongated items. For example, the support bracket 120 can be made to hold more than four load bars by thickening the base 122 and adding more spaced apart bracket arms 124. Similarly, the support bracket 120 can be made to support different sizes of elongated items by varying the dimensions of support bracket 120 and the shape and/or dimensions of the spaces between the adjacent bracket arms 124.

The E-clips 150 are slipped onto the engagement tabs 128 at the ends of the support bracket 120 by forcefully moving the E-clips inwardly on the longitudinal axis of the support bracket. The locking tab 130 is passively deflected by the wedging action of the shoulders of the mounting slots 154 of the E-clip 150 when the E-clip is moved inwardly. Once past the distal end of the locking tab 130, the E-clip 150 is retained on the engagement tab 128 unless specific operator actions, described below, are taken. As described earlier, the E-clip 150 has some "play" in its axial position on the engagement tab 128, thereby readily permitting alignment of the E-clips with slots 52 in the E-track, even when the positioning of the slots or the length of the base 122 of the support bracket 120 vary from specification.

The E-clips 150 are removed from the support bracket 120 in the following manner. The storage device 100 is first removed from the E-track 150 and then the E-clip 150 is abutted against the transverse exposed end of the locking tab 130. By pressing inwardly on the outwardly extended side of the locking tab 130 manually or with a tool such as a screwdriver, the locking tab can be depressed sufficiently so that it no longer projects beyond the flat surfaces of the engagement tab 128. With the locking tab 130 thus depressed, the E-clip 150 may then be slid outwardly in the direction of the longitudinal axis of the support bracket 120 so that its mounting slot 154 is fully disengaged from the engagement tab 128 of the support bracket.

The First Installation Method

The installation of the storage device 100 onto a supporting E-track 50 is best understood while referring to FIGS. 9 and 10. With the E-clips 150 positioned on the support bracket 120, the support bracket is tilted about a horizontal axis parallel to the longitudinal axis of an E-track 50 and the E-clips 150 are centered on slots 52 of the E-track. The second end of the E-clips is positioned so that lower sides of the second notches 157 and the notches at the first end of latch 160 are engaged with the lower untabbed sides of slots 52 of the E-track 50. At this point, the E-clips 150 cannot be rotated inwardly to latch into the slots 52 because of interference of the first, upper end of the E-clips with the body of the E-track 50 at the upper edge of its respective slot 52.

With the storage device 100 supported by one hand of the operator, the extended tang of the latch 160 is manually depressed by the second hand of the operator in an outward direction relative to the U-shape of the body 152 on a first E-clip 150. For purposes of description, assume that the first E-clip 150 is on the lefthand side of the storage device 100 when facing the wall 11, so that the right hand of the operator supports the storage device 100 and the left hand depresses the latch 160 of the lefthand E-clip.

The depression of the tang of the latch 160 permits the lower untabbed edge of the lefthand slot 52 of the E-track 50 to abut against the transverse inner end of the second notch 157 of the lefthand E-clip 150. This is due to the opening of a gap between the edge 166 of the latch 160 and the lower side of the second notch 157 of the E-clip body 152 as a consequence of the rotation of the latch. This downward shift of the lefthand E-clip 150 then permits that E-clip to be rotated by manually rotating with the right hand of the operator the support bracket 120 of the storage device 100. This rotation causes the first notch 156 of the lefthand E-clip, mounted to the rotated storage device 100, to be adjacent to and aligned for engagement at the upper untabbed edge of the slot 52.

Using the left hand, the operator can then shove the lefthand E-clip 150 upwardly so that the latch 160, biased by spring 180, can cause the second side of the notch at the first end of the latch to abut the lower untabbed side of the slot 52 of the E-track 50 while the first side 164 of the said latch notch engages the exposed vertical side of the E-track adjacent the latch notch. At this point, the latching of the first E-clip 150 onto the E-track 50 is complete.

It should be noted that it is not necessary to have the righthand E-clip 150 partially engaged in its respective slot 52 during the rotation and latching of the lefthand end of the stowage assembly 100. Should the righthand E-clip 150 remain partially engaged in its slot 52, then the body 122 of the support bracket 120 must be twisted about its longitudinal axis on the order of 5° to 10° for the insertion, since the interference of the righthand E-clip with the E-track will not permit the righthand end of the storage device 100 to rotate.

If the righthand E-clip 150 is not partially engaged during the rotation of the lefthand side of the storage device for the latching on that side, then some combination of movement of the lefthand E-clip relative to its engagement with the engagement tab 128 of the support bracket 120 plus the bending in of the engagement tab and body 122 of the support bracket must occur. The low bending and torsional moduli of elasticity of the body 122 of the support bracket 120, along with its relatively narrow width and low thickness, facilitate the manual twisting and bending of the support bracket 120.

For the latching of the assumed righthand second E-clip 150 to its corresponding slot 52 of the E-track, the storage device 100 is manipulated so that its second notch is engaged or reengaged with the lower untabbed edge of its slot. This will require at a minimum manual twisting of the support bracket 120, as shown in FIG. 11, and probably some bending of the support bracket. At that point, the latch 160 of the E-clip 150 is depressed by the right hand of the operator and engagement of the righthand E-clip proceeds similarly to the engagement of the lefthand E-clip, except that the rotation of the of the E-clip and the attached support bracket 120 is accomplished by the left hand of the operator.

The Second Installation Method

The second installation method can be used for more torsionally and flexurally rigid constructions of storage devices 100. The high torsional rigidity attendant with conventional steel device construction prevents the twisting of the device in order to cause it to be engaged by one E-clip at a time. Accordingly whenever storage device 100 is made of metal or another rigid material, the storage device must latch multiple E-clips at the same time. This second installation procedure is described below.

With the E-clips 150 positioned on the support bracket 120, the support bracket is tilted about a horizontal axis parallel to the longitudinal axis of an E-track 50 and the E-clips 150 are centered on slots 52 of the E-track. The second end of the E-clips 150 is positioned so that lower sides of the second notches 157 and the notches at the first end of latch 160 are engaged with the lower untabbed sides of slots 52 of the E-track 50. At this point, the E-clips 150 cannot be rotated inwardly to latch into the slots 52 because of interference of the first, upper end of the E-clips with the body of the E-track 50 at the upper edge of its respective slot 52.

With the ends of the storage device 100 supported by both hands of the operator, the extended tangs of the latches 160 are manually depressed in an outward direction relative to the U-shape of the bodies 152 on the E-clips 150. The depression of the tangs of the latches 160 permits the lower untabbed edges of the slots 52 of the E-track 50 to abut against the transverse inner ends of the second notches 157 of the E-clips 150. This is due to the opening of gaps between the edges 166 of the latches 160 and the lower sides of the second notches 157 of the E-clip bodies 152 as a consequence of the rotation of the latches. This downward shift of the E-clips 150 then permits the E-clips to be rotated by manually rotating both sides of the support bracket 120 of the storage device 100. This rotation causes the first notches 156 of the E-clips 150, mounted to the rotated storage device 100, to be adjacent to and aligned for engagement at the upper untabbed edges of the slots 52. Using both hands, the operator can then shove the E-clips 150 upwardly so that the latches 160, biased by springs 180, can cause the second sides of the notches at the first ends of the latches to abut the lower untabbed sides of the slot 52 of the E-track 50 while the first side 164 of the said latch notch engages the exposed vertical side of the E-track adjacent the latch notch. At this point, the latching of the E-clips 150 onto the E-track 50 is complete, so that the entire storage device 100 is fully latched and supported.

This second installation method of mounting of the E-clips 150 onto the E-track requires more dexterity than does the first, preferred method of mounting. While this second mounting method is similar to other procedures routinely performed by trucking personnel, the more convenient preferred method of mounting is enabled by selection of a material having high torsional and bending flexibility for the support bracket.

Operation of the Retainer Rod

The retainer rod 140 of the storage device 100 of the present invention is operated in a different manner than prior retainer rods made of more rigid materials, such as steel or aluminum. In particular, the self-locking capability of the retainer rod 140 permits simple, one-hand operation of the retainer rod, thereby permitting the operator to manipulate or brace the load bar 20 that is being stowed or removed from stowage. This provides a great advantage over the retaining rods of prior designs of stowage means that were not self-locking.

Consider the loading of multiple load bars 20 into the slots formed in a mounted support bracket 120, wherein each slot is formed by two vertical opposed faces of adjacent bracket arms 124 and the cojoining outer vertical side face of the base 122 between those bracket arms. A vertically downward end view of a load bar 20 in a slot of the support bracket 120 is shown in FIG. 17 with the draft angle of the bracket arms 124 exaggerated for illustration purposes.

The first load bar 20 is engaged in a first slot at either end of the support bracket 120 and, if necessary, supported by the hand of the operator. This engagement is facilitated by the draft angles provided on the vertical interior sides of the bracket arms 124, since the wider entry to the slots eases initial engagement of the load bars. At the same time, the closer confinement of the bars when fully engaged improves lateral support and leads to reduced shock loads resulting from rapid gap closures when the vehicle is underway. The load bar 20 is vertically or near vertically positioned and is manually pressed with one hand so that its inner side abuts the side of the base 122 at the inner end of the slot in the support bracket 120.

The operator then grasps the shank 141 of the retainer rod 140 and inserts its second end into the first two pin holes 126 of the support bracket 120 from the outboard end of the support bracket on the side of the bracket where the first load bar is positioned. The length of insertion of the retainer rod 140 is such that the tip of the retainer rod at its second end does not extend into the next, empty slot of the support bracket 120 sufficiently to block insertion of the next load bar 20 therein. While the retainer rod is not axially restrained at this stage except by friction between itself and the holes 126 in the bracket arms 124 of the support bracket 120, it does retain the first load bar 20 so that the bar cannot dislodge inadvertently from the slot of the support bracket.

This loading and retaining of the load bars 20 into the slots of the support bracket 120 proceeds sequentially and in a similar manner from the first slot with each load bar being inserted into a slot adjacent a previously filled slot. With each newly inserted load bar, the retainer rod 140 further extended to be engaged in the hole 126 on the far side of the slot just filled. The retainer rod 140 does not need to be removed between insertions of the load bars 20.

When the final load bar is in place, the retainer rod 140 is fully inserted into the holes 126 of the support bracket 120 so that the displacer ridge 143 is passed through the pin hole 126 of the bracket arm 124 adjacent the shank 141 of the retainer rod. This passage of the displacer ridge 143 through the hole 126 requires lateral bending of the main shaft of the retainer rod 140, where the bending is in the plane of symmetry of the reduced surface 142 and the displacer ridge.

The removal of the portion of the cross-section of the retainer rod 140 at the reduced surface 142 permits lateral displacement of the rod longitudinal axis as a result of wedging action between the cylindrical surface of the displacer ridge 143 and the wall of the hole 126 during manual inward axial thrusting of the rod. FIG. 16 illustrates the displacement of the retainer rod 140 during the insertion passage of the displacer ridge through a hole 126.

Once the displacer ridge 143 is fully past the far side of the hole 126, the retainer rod 140 autonomously straightens in a rebound response to internal elastic forces induced during bending. When the unbent retainer rod 140 moves in the reverse direction to release, the transverse end of the displacer ridge 143 encounters and abuts the interior transverse side of slot formed by a bracket arm 124, thereby preventing withdrawal. Thus, inadvertent withdrawal of the retainer rod 140 from the support bracket 120 is prevented. Only simple thrusting one-hand manipulation of the retainer rod 140 is required to obtain this safe stowage of the load bars in the storage device 100 of the present invention.

The removal of the retainer rod 140, or its displacement to a partially engaged position, requires that the rod be bent by manually applying a lateral bending moment to the rod shank 141. This application of bending is simply accomplished by a one-handed manual lateral displacement of the shank 141 in the midplane of symmetry of the reduced surface 142 and the displacer ridge 143 and in the direction away from the displacer ridge. The induced bending from this manually applied force produces the curvature of the retainer rod shown in FIG. 16, thereby allowing withdrawal of the displacer ridge 143 through the hole 126. After passage of the displacer ridge 143 fully through the hole 126, further withdrawal of the rod 140 may be accomplished without bending. Unloading of the load bars 20 can proceed sequentially in the reversal of the loading procedure described above for the loading.

This approach to retention of the retainer rod 140 is possible because of the low bending modulus of elasticity of the material used for the rod and the relatively small cross-section of the rod. For the short spans involved between adjacent bracket arms 124, an alternate steel retainer rod would have to have a much smaller diameter, but the reduction of strength of a steel bar by provision of the reduced surface 142 would weaken the alternate bar excessively. The choice of low elastic bending modulus material for the construction of the retainer rod 140 enables this the simple design and use of the retainer rod 140.

Advantages of the Invention

The selection of materials having low values of bending and torsional elastic moduli enables the storage device 100 of the present invention to be operated more safely. In particular, the retainer rod can be fully engaged and locked into engagement by manipulation by one hand. Similarly, the retainer rod can be fully unlocked and disengaged using one hand. This one-handed manipulation and operation of the latching feature of the retainer rod is enabled by the low bending strength of the retainer rod.

Likewise, the selection of materials having low values of bending and torsional elastic moduli for the support bracket enables the simple retention and release of the E-clips on the support bracket. Only low forces need to be applied to unlatch the E-clips, but they are at the same time strongly retained. The low modulus material used for the support bracket and its integral locking tab greatly reduces the transverse force needed to deflect the locking tab.

Furthermore, the selection of injection moldable thermoplastics or cast polyurethane for the support bracket leads to dramatic reductions in fabrication costs for the storage device. Additionally, the plastic parts are better able to withstand accidental impacts and shock loads than comparable rigid metal structures. Likewise, the use of injection molded thermoplastic for the retainer rod leads to cost reductions, along with improved shock resistance.

The draft angles on the bracket arms of the support bracket cause the slot formed between adjacent arms to inwardly converge, thus easing entry of the load bars into the bracket and at the same time providing closer retention of the bars when fully in place. This tapered type of structure would be more expensive to provide in a welded steel structure.

The compatibility of the storage device of the present invention with standard E-clip and E-track mounting systems also provides a significant advantage for truckers, since E-tracks are frequently preinstalled in truck and trailer cargo compartments.

The design of the present invention may be altered somewhat without departing from the spirit of the invention. For instance, the outer bracket arms could have reinforcing bosses added to their exterior sides around the pin holes so that the exterior pin holes are axially lengthened. Likewise, buttresses or reinforcing ribs could be added to the exterior lateral faces of the outer bracket arms without changing the basic operation of the storage device.

The locking tabs could be configured to normally protrude on the same side of the support bracket as the support arms. The E-clips could be inverted so that their latches are on the upper side. The slots could be given different dimensions and shapes to stow different types of elongate members.

A wide variety of alternate low elastic modulus materials, including some which are not thermoplastics, could be used for the construction of the retainer rod and the support bracket. One, two, or more than two storage devices 100 could be used to support elongate members of extended length. Horizontally extended members could also be stowed with the present invention, provided that the weights were not excessive. As will be recognized by those skilled in the art, these and other modifications can be made without departing from the spirit of the invention.

What is claimed is:

1. A storage device comprising:
   (a) a support bracket having
       a base having a first surface, a second opposed surface, and two engagement tabs outwardly extending from the base along a longitudinal axis of the base, one tab extending from a first end of the base and a second tab extending from a second end of the base, wherein each engagement tab has a bendable inclined cantilevered locking tab, the locking tab having a distal tip projecting beyond the first surface of the base,
       a plurality of bracket arms extending perpendicularly from the second surface of the base transverse to the longitudinal axis of the base, and
       a pin hole penetrating each bracket arm distal to the base, wherein the pin holes in the bracket arms are coaxially aligned; and
   (b) a retainer rod threadable through the coaxially aligned pin holes, wherein the retainer rod has a cylindrical main body having a reduced surface section proximal a first end of the retainer rod and a tapered displacer ridge mounted on an opposed side of the main body diametrically opposite to a portion of the reduced surface section.

2. The storage device of claim 1, further comprising two E-clips with one E-clip mounted on each engagement tab.

3. The storage device of claim 1, wherein the bracket arms are equispaced along the base.

4. The storage device of claim 1, wherein a lateral surface of each bracket arm tapers outwardly from the base.

5. The storage device of claim 1, wherein the coaxially aligned pin holes have an axis parallel to a longitudinal axis of the base.

6. The storage device of claim 1, further comprising an E-clip mounted on each engagement tab and retained thereon by the locking tab of the engagement tab.

7. The storage device of claim 1, wherein the displacer ridge extends radially outwardly towards the first end of the retainer rod.

8. A storage device comprising:
   (a) a support bracket having
       (i) a base having two engagement tabs outwardly extending from the base along a longitudinal axis of the base, wherein one engagement tab extends from a first end of the base and a second engagement tab extends from a second end of the base, wherein each engagement tab has an integral locking tab that is a bendable inclined cantilever having a distal tip projecting beyond a first surface of the base such that when a portion of each engagement tab is surrounded by a mounting slot of an E-clip, the engagement tab is retained in the mounting slot of the E-clip by the locking tab,
       (ii) a plurality of bracket arms extending perpendicularly from a second surface of the base, and
       (iii) a pin hole penetrating each bracket arm distal to the base, wherein the pin holes in the bracket arms are coaxially aligned; and
   (b) a self-locking retainer rod threadable through the coaxially aligned pin holes.

9. The storage device of claim 8, wherein the support bracket is torsionally flexible about a longitudinal axis of the support bracket.

10. The storage device of claim 9, wherein the support bracket is made of a material having a lower bending moduli than steel.

11. The storage device of claim 8, wherein the retainer rod has a cylindrical main body with a handle at a first end and a distal tip.

12. The storage device of claim 11, wherein the main body has a reduced surface section proximal the handle and a displacer ridge on an opposed side of the main body diametrically opposite to the reduced surface section.

13. A storage device comprising:
   (a) a support base having two engagement tabs outwardly extending from the support base along a longitudinal axis of the base, one tab extending from a first end of the base and a second tab extending from a second end of the base, wherein each engagement tab has a bendable inclined cantilevered locking tab, the locking tab having a distal tip projecting beyond a first surface of the support base;
   (b) a plurality of bracket arms extending perpendicularly from a second surface of the base, the bracket arms having coaxially aligned pin holes distal to the base, wherein the pin holes are centrally located in each bracket arm proximal to a distal end of the bracket arm and have an axis parallel to a longitudinal axis of the base; and
   (c) a self-locking retainer rod threadable through the coaxially aligned pin holes, wherein the retainer rod has a cylindrical main body, the main body having a handle at a first end and a reduced surface section proximal the first end and a displacer ridge on an opposed side of the main body diametrically opposite to the reduced surface section.

14. The storage device of claim 13, further comprising an E-clip mounted on each engagement tab.

15. The storage device of claim 13, wherein each bracket arm tapers in a vertical direction toward a distal end.

* * * * *